United States Patent
Dybsetter

(10) Patent No.: US 8,930,434 B2
(45) Date of Patent: Jan. 6, 2015

(54) INTEGRATED MULTIPLY AND DIVIDE CIRCUIT

(75) Inventor: Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 1287 days.

(21) Appl. No.: 11/531,074

(22) Filed: Sep. 12, 2006

(65) Prior Publication Data

US 2007/0083584 A1    Apr. 12, 2007

Related U.S. Application Data

(60) Provisional application No. 60/717,351, filed on Sep. 15, 2005.

(51) Int. Cl.
*G06F 7/38*    (2006.01)
*G06F 9/30*    (2006.01)
*G06F 7/57*    (2006.01)

(52) U.S. Cl.
CPC ............. *G06F 7/57* (2013.01); *G06F 9/3001* (2013.01)
USPC ........................................ 708/523

(58) Field of Classification Search
CPC ..................................... G06F 9/30
USPC ................. 708/501, 503–4, 620, 650
See application file for complete search history.

(56) References Cited

U.S. PATENT DOCUMENTS

| 4,665,500 | A  | * | 5/1987  | Poland ............................ 708/628 |
| 5,309,561 | A  | * | 5/1994  | Overhouse et al. ........... 713/375 |
| 6,175,911 | B1 | * | 1/2001  | Oberman et al. .............. 712/221 |
| 6,487,575 | B1 | * | 11/2002 | Oberman ........................ 708/504 |
| 6,810,435 | B2 | * | 10/2004 | Palmer et al. ..................... 710/8 |
| 7,225,323 | B2 | * | 5/2007  | Siu et al. ........................ 712/222 |
| 7,499,962 | B2 | * | 3/2009  | Tang et al. ..................... 708/501 |

OTHER PUBLICATIONS

R. Gnanasekaran, A Fast Serial-Parallel Binary Multiplier, IEEE, 1985, pp. 741-744.*

* cited by examiner

*Primary Examiner* — Chat Do
*Assistant Examiner* — Kevin G Hughes
(74) *Attorney, Agent, or Firm* — Maschoff Brennan

(57) ABSTRACT

The principles of the present invention relate to a multiply and divide circuit configured to interactively multiply and/or divide. The circuit may handle signed and unsigned values. The circuit comprises an instruction register configured to store a multiply or divide instruction, at one input register configured to store the multiply or divide operands, an Arithmetic Logic Unit ("ALU") configured to add provided values, and configuration circuitry. The configuration circuitry responds to the instructions and performs the multiply or divide operation by iteratively providing values to the ALU.

10 Claims, 3 Drawing Sheets

| | | INIT | MUL_ITERATE | MUL_PRD2COMP | MUL_PRDSHL | DIV_DND2COMP | DIV_ITERATE | DIV_QUO2COMP | DONE |
|---|---|---|---|---|---|---|---|---|---|
| AMUX 112 | 000 | ● | - | - | - | - | - | - | ● |
| | 001 | - | ● | - | - | - | ● | - | - |
| | 010 | - | - | - | ● | B pos | - | - | - |
| | 011 | - | - | - | - | B neg | - | - | - |
| | 100 | - | - | - | - | - | - | ● | - |
| | 101 | - | - | ● | - | - | - | - | - |
| ANOT 114 | 0 | ● | A pos | - | ● | B pos | A neg | - | ● |
| | 1 | - | A neg | - | - | B neg | A pos | ● | - |
| BMUX 113 | 00 | ● | - | ● | ● | ● | - | ● | ● |
| | 01 | - | - | - | - | - | ● | - | - |
| | 10 | - | ● | - | - | - | - | - | - |
| CMUX 111 | 0 | ● | A pos | - | ● | B pos | A neg | - | ● |
| | 1 | - | A neg | ● | - | B neg | A pos | ● | - |
| HMUX 116 | 000 | - | bit=0 | R pos | ! SHL | - | - | R pos | ● |
| | 001 | - | - | - | - | - | ● | - | - |
| | 010 | ● | - | - | - | ● | - | - | - |
| | 011 | - | bit=1 | R neg | SHL | - | - | - | - |
| | 100 | - | - | - | - | - | - | R neg | - |
| LMUX 117 | 00 | - | bit=0 | R pos | ! SHL | - | OV | ● | ● |
| | 01 | ● | - | - | - | - | - | - | - |
| | 10 | - | bit=1 | R neg | SHL | ● | ! OV | - | - |

| | |
|---|---|
| A pos | : rdA is unsigned or signed and positive |
| A neg | : rdA is signed and negative |
| B pos | : rdB is unsigned or signed and positive |
| B neg | : rdB is signed and negative |
| R pos | : A neg XOR B neg == 0 |
| R neg | : A neg XOR B neg == 1 |
| bit=0 | : multiplier 2's complement bit == 0 |
| bit=1 | : multiplier 2's complement bit == 1 |
| OV | : sum (31:16) ! = 0 |
| !OV | : sum (31:16) == 0 |
| SHL | : opcode is multiply with shift left |
| !SHL | : opcode is NOT multiply with shift left |
| - | : not selected |
| ● | : always selected |

*FIG. 3*

INTEGRATED MULTIPLY AND DIVIDE CIRCUIT

CROSS-REFERENCE TO RELATED APPLICATIONS

This application claims the benefit of U.S. Provisional Application No. 60/717,351, filed Sep. 15, 2005, which is incorporated herein by reference in its entirety.

BACKGROUND

1. The Field of the Invention

The present invention relates generally to multiply and divide circuits. More specifically, the present invention relates to a circuit that may either multiply or divide by interactively shifting and adding using a single arithmetic logic unit.

2. The Relevant Technology

Digital technology had transformed our world, and has led to such complex digital structures as high speed computers and digital communications networks. However, regardless of how complex the digital structure is, the structure relies on the processing of binary values. An example of such processing is multiplying and dividing through the use of binary multiplier and divider circuits.

Multiplication and division can be done in a variety of ways. For example, binary multiplication may be accomplished iteratively. On the first iteration, one bit of the multiplier would be multiplied by the entire multiplicand, and then shifted by an appropriate degree of magnitude of the multiplier bit to generate an initial product. Other products may be generated by multiplying (one at a time) the other multiplier bits by the entire multiplicand. In the interactive process, these intermediate products may be added cumulatively, until after all iterations are complete, the final product is generated.

Binary division may also be accomplished iteratively. On the first iteration, the divisor is divided into the entire dividend and a one is placed in the quotient. The divisor is then subtracted from the dividend. On the next iteration, the divisor is divided into the difference from the first iteration. If the divisor is larger than the difference, the dividend is shifted to the right one bit and a zero is added to the right end of the quotient. The shifting iterations takes place, with an accompanying zero being added to the right end of the quotient, until the difference plus the shift values are larger than the divisor. At that point a one is added to the right end of the quotient and the divisor is again subtracted from the dividend. In the interactive process, the shifting and subtracting repeats until the remaining bits in the dividend are less than the divisor. The final quotient will be the combination of ones and zeros with the remainder being the bits left over from the dividend.

Because multiplication and division of binary numbers includes adding and subtracting, the sign of the binary numbers is important. This has led to the development of signed and unsigned formats for representing binary values. Unsigned formats may be used to represent non-negative numbers. For example, the following table shows how three bits may be used to represent 8 different non-negative numbers (assuming that the binary point is to the right of the least significant bit):

TABLE 1

Unsigned Example

| Binary Number | Base Ten Value | Interpretation of bits |
|---|---|---|
| 000 | 0 | $0 \times 2^2 + 0 * 2^1 + 0 * 2^0$ |
| 001 | 1 | $0 \times 2^2 + 0 * 2^1 + 1 * 2^0$ |
| 010 | 2 | $0 \times 2^2 + 1 * 2^1 + 0 * 2^0$ |
| 011 | 3 | $0 \times 2^2 + 1 * 2^1 + 1 * 2^0$ |
| 100 | 4 | $1 \times 2^2 + 0 * 2^1 + 0 * 2^0$ |
| 101 | 5 | $1 \times 2^2 + 0 * 2^1 + 1 * 2^0$ |
| 110 | 6 | $1 \times 2^2 + 1 * 2^1 + 0 * 2^0$ |
| 111 | 7 | $1 \times 2^2 + 1 * 2^1 + 1 * 2^0$ |

In this example, the each binary one bit contributes $2^n$ to the total value, where "n" represents the position of the bit in the sequence with 0 being the right-most bit.

A common way of representing signed binary values is referred to as "twos-complement". In twos complement format, each positive bit contributes the same as each position would in the unsigned format just described, with one exception. The left-most and most significant bit contributes a negative value to the total sum. The following shows how three bits in twos complement format may represent numbers from −3 to 4 (assuming that the binary point is to the right of the least significant bit):

TABLE 2

Signed Example

| Binary Number | Base Ten Value | Interpretation of bits |
|---|---|---|
| 000 | 0 | $0 \times 2^{-2} + 0 * 2^1 + 0 * 2^0$ |
| 001 | 1 | $0 \times 2^{-2} + 0 * 2^1 + 1 * 2^0$ |
| 010 | 2 | $0 \times 2^{-2} + 1 * 2^1 + 0 * 2^0$ |
| 011 | 3 | $0 \times 2^{-2} + 1 * 2^1 + 1 * 2^0$ |
| 100 | −4 | $1 \times 2^{-2} + 0 * 2^1 + 0 * 2^0$ |
| 101 | −3 | $1 \times 2^{-2} + 0 * 2^1 + 1 * 2^0$ |
| 110 | −2 | $1 \times 2^{-2} + 1 * 2^1 + 0 * 2^0$ |
| 111 | −1 | $1 \times 2^{-2} + 1 * 2^1 + 1 * 2^0$ |

Many multiply or divide circuits are only configured to do either a multiply or a divide operation. In addition, many multiply or divide circuits cannot handle both unsigned and signed values simultaneously. Often the solution to this has been to implement more than one multiply or divide circuit. However, this may be costly and an inefficient use of space.

Therefore, what would be advantageous is a multiply and divide circuit with the flexibility to do both multiply and divide operations on both signed and unsigned binary numbers while minimizing hardware space.

BRIEF SUMMARY

The forgoing problems with the prior state of the art are overcome by the principles of the present invention. The principles of the present invention relate to a multiply and divide circuit configured to interactively multiply and/or divide. The circuit may handle any combination of signed and unsigned values. The circuit comprises an instruction register configured to store a multiply or divide instruction, at least one input register configured to store the multiply or divide operands, an Arithmetic Logic Unit ("ALU") configured to add provided values, and configuration circuitry. The configuration circuitry responds to the instructions and performs the multiply or divide operation by iteratively providing values to the ALU.

As mentioned, the input register is configured to store both signed and unsigned operands. The input register receives an instruction from the instruction register that indicates whether a divide or multiplication operation is to occur. Further, the instruction indicates whether the multiply or divide operation will be performed on signed or unsigned values or a combination of signed and unsigned values. In this way, the circuit of the present invention is able to handle both multiplication and division of signed and unsigned values.

In addition, the configuration circuitry and the ALU are flexible enough to perform both multiply and divide operations on signed and unsigned values provided by the input register. A state machine is implemented that controls the operation of the various components of the configuration circuitry depending on if a multiplication or division operation is being performed. For example, the multiplexer components of the configuration circuitry provide different combinations of signed and unsigned values to the ALU depending on what state the state machine is in.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 illustrates a table of the multiply/divide circuit of FIG. 1.

DETAILED DESCRIPTION

The principles of the present invention relate to a multiply and divide circuit configured to interactively multiply and/or divide. The circuit may handle any combination of signed and unsigned values. The circuit comprises an instruction register configured to store a multiply or divide instruction, at least one input register configured to store the multiply or divide operands, an Arithmetic Logic Unit ("ALU") configured to add provided values, and configuration circuitry. The configuration circuitry responds to the instructions and performs the multiply or divide operation by iteratively providing values to the ALU.

Figure 1:
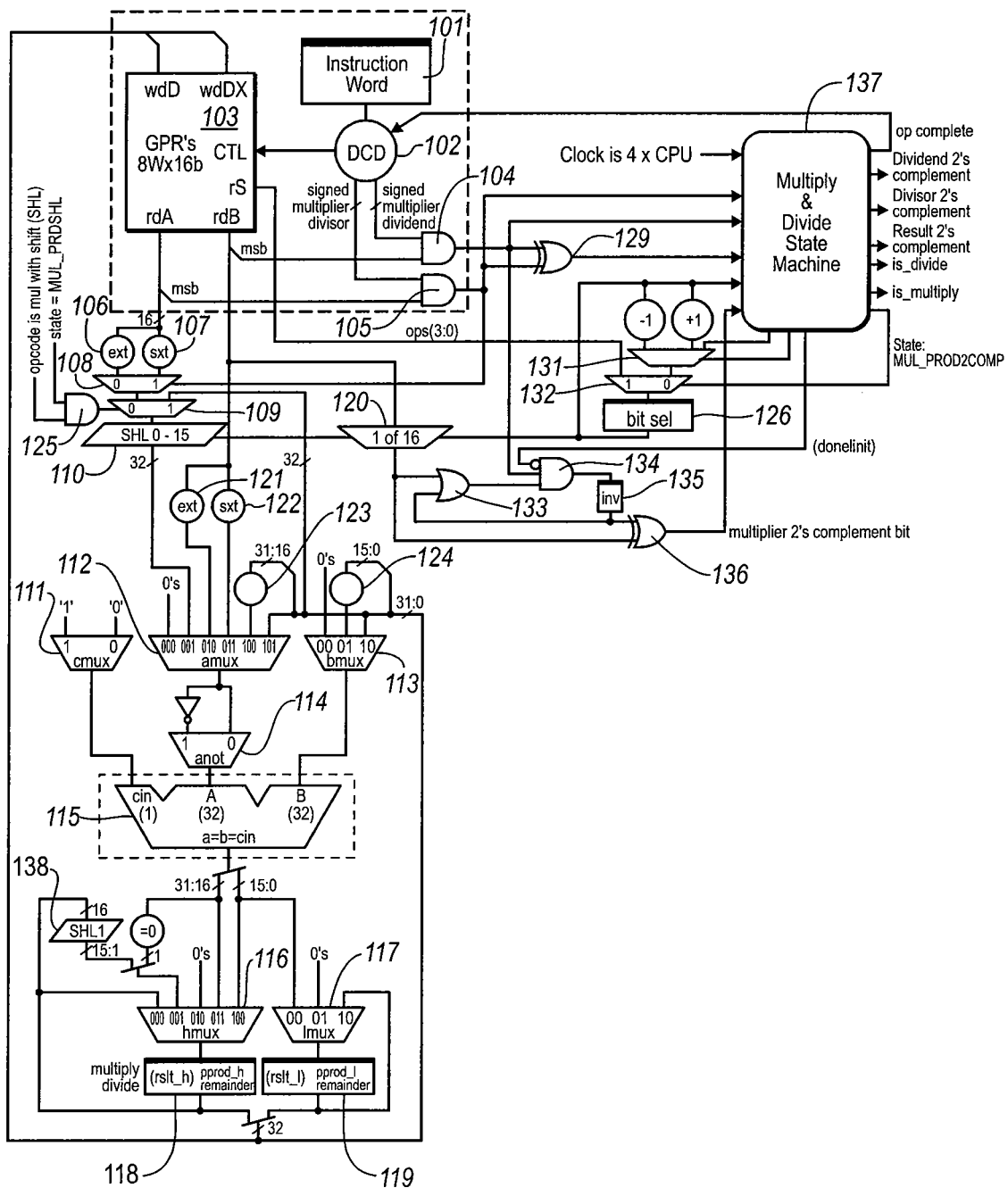
FIG. 1 illustrates schematic diagram of a multiply/divide circuit in accordance with the principles of the present invention.

FIG. 1 illustrates a multiply and divide circuit 100 in which the principles of the present invention may be employed. While the multiply and divide circuit 100 will be described in some detail, the multiply and divide circuit 100 is described by way of illustration only, and not by way of restricting the scope of the invention. Multiply and divide circuit 100 may be implemented as part of a larger circuit such as a microprocessor, although this is not required. Multiply and divide circuit 100 may also be a free standing circuit.

Multiply and divide circuit 100 includes an instruction register 101 that is configured to store a microcode instruction. The microcode instruction directs multiply and divide circuit 100 to perform either a multiply or divide operation. Instruction register 101 may be any size necessary to accommodate the size of the stored instruction.

An input register 103 also is included in multiply and divide circuit 100. The input register 102 may be configured to store the operands of the multiply and divide operations. The operands may be either signed or unsigned values. Input register 103 receives an instruction from instruction register 101 that determines which multiply or divide operands are selected for manipulation by multiply and divide circuit 100.

Multiply and divide circuit 100 also includes an ALU 115. ALU 115 is configured to add values that are provided to it. For example, ALU 115 may perform addition on two or more values that are provided to it. A carry-over value may also be added to the other inputs when necessary during binary addition. ALU 115 may be the ALU of a microprocessor and may be shared by multiply and divide circuit 100 with other microprocessor functions. Alternatively, ALU 115 may be a stand alone component in the multiply and divide circuit.

In order to perform the multiply or divide on the operands, multiply and divide circuit 100 also includes configuration circuitry configured to perform the appropriate operation. Referring to FIG. 1, various components such as extenders, multiplexers, and shifters are shown. These components, which will be described in specific examples below, perform the multiply and divide operations and iteratively provide the values of the operands to the ALU 115. Registers are also included in the configuration circuitry for the storage of values added by the ALU 115. These values may be fed back into ALU 115 for further manipulation. The various components of the configuration circuitry may be of any type known to one skilled in the art, the specific architecture being unimportant to the principles of the present invention.

Figure 2:
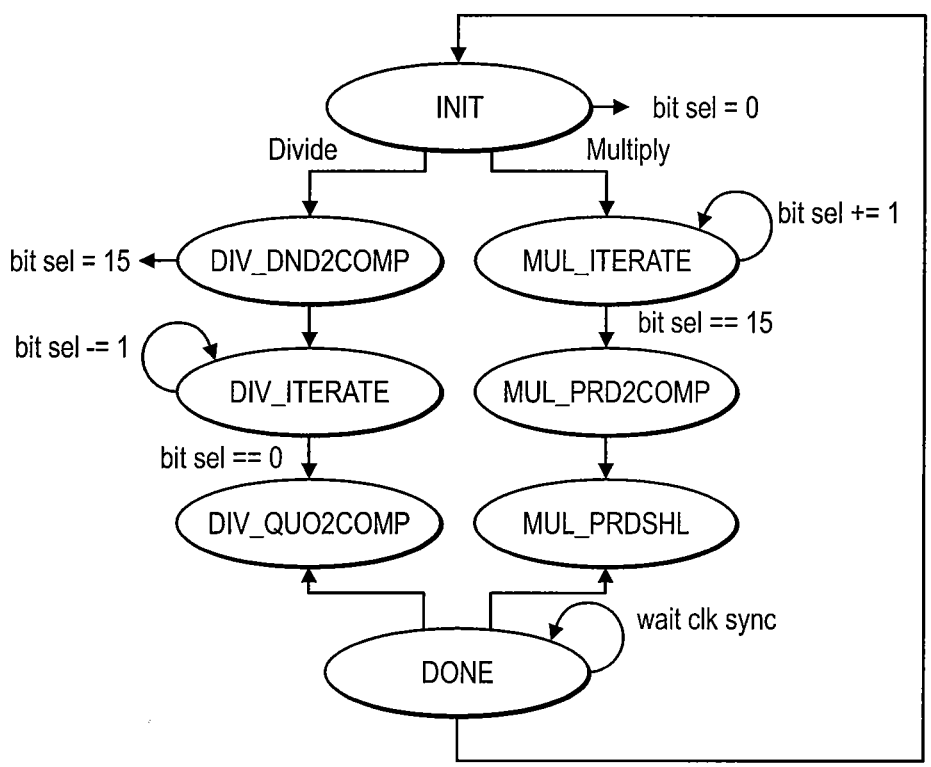
FIG. 2 illustrates a state diagram of the state machine of FIG. 1.

Central to the control of the configuration circuitry is a multiply and divide state machine 137. State machine 137 is used to control the various states of multiply and divide circuit 100. Referring to FIG. 2, a state diagram of multiply and divide state machine 137 is shown. The state diagram shows the different states for both a multiply operation and a divide operation. Referring to FIG. 3, a table illustrating during which states the various multiplexers of the multiply and divide circuit 100 are selected is shown. For both multiply and divide operations, the first state is the INIT state. During the INIT state, multiplexers 111, 112, 113, 116, and 117 are all configured to provide zeros to the ALU 115 or to output registers 118 or 119. In addition, the bit select is set to zero.

The next state in the multiply operation is the MUL_ITERATE state. During this state, multiply and divide circuit 100 iteratively shifts an operand and provides the shifted values to the ALU 115 for manipulation. Multiply and divide circuit 100 is configured to shift the operand to the left from zero bits to a desired number of bits. There is one shift per clock cycle. For example, if the operand is a 16 bit value, then multiply and divide circuit may shift the operand zero bits the first clock cycle, one bit the next clock cycle and so on to 15 bits in the sixteenth clock cycle, at which time the bit select would be 15. As mentioned, after the operand has been shifted, the value is provided to the ALU 115 where it is manipulated and provided to output registers 118 and 119 for further use. Note that the output registers 118 and 119 are used as accumulation registers for the iterative addition.

At the completion of the interactive shifting and adding, the multiply and divide circuit 100 enters the MUL_PRD2COMP state. During this state, the results of the prior state are fed back to the ALU 115 for further manipulation to generate the properly signed or unsigned result.

The next state in a multiply operation is the MUL_PRD-SHL state. During this state, an additional shift by a particular number of bits determined by an instruction may occur before a value is provided to the ALU 115 and the registers 118 or 119. This feature allows for the multiplication's product to be divided by the power of two (2) before final results, providing $Rslt=opA*opB/2^{ops}$. The final state is the done state, which resets multiply and divides circuit 100.

In a division operation, the DIV_DND2COMP state comes after the INIT state discussed above. During this state, an operand is provided to the ALU 115 for manipulation and for populating output registers. In addition, in this state the bit select is set to a desired value. For example, if the operand is a 16 bit number, then the hit select is set to 15.

The next state in the divide operation is the DIV_ITERATE state. During this state, multiply and divide circuit 100 iteratively shifts an operand and provides the shifted values to the ALU 115 for manipulation. Multiply and divide circuit 100 is configured to shift the operand to the left from a desired number of bits to zero bits. There is one shift per clock cycle. For example, if the operand is a 16 bit value, then multiply and divide circuit may shift the operand 15 bits the first clock cycle, 14 bit the next clock cycle and so on to zero bits in the sixteenth clock cycle, at which time the bit select would be zero. As mentioned, after the operand has been shifted, the value is provided to the ALU 115 where it is manipulated and provided to output registers 118 and 119 for further use. Note that the output registers 118 and 110 are used as accumulatin registers for the iterative addition.

The next state in a divide operation is the DIV_QUO2COMP state. During this state, the results of the prior state are fed back to the ALU 115 for further manipulation. The final state is the DONE state, which resets multiply and divides circuit 100.

In some embodiments, multiply and divide circuit 100 may be part of a system such as an optical transceiver that has a system clock. Generally, the system clock would control the clock cycles of the ALU 115, state machine 137, and the other circuitry components of multiply and divide circuit 100 that require a clock. However, it may be desirable to run the circuitry components of multiply and divide circuit 100 that require a clock at a speed faster than the speed of the system clock. To accomplish this, an independent, synchronous clock may be used to control the speed of the ALU circuitry components of multiply and divide circuit 100 that require a clock. For example, the speed of the system clock may be 10 MHz, while the speed of the independent, synchronous clock may be 40 MHz. This would allow the circuitry components of multiply and divide circuit 100 that require a clock to have four clock cycles for every one clock cycle of the system clock. In some operations, this requires multiply and divide circuit 100 to wait a few clock cycles in the DONE state for the independent, synchronous clock to sync with the system clock. For example, suppose the independent clock was 40 MHz and the system clock was 10 MHz. If it only took 17 cycles of the independent clock to complete a multiply or divide operation, multiply and divide circuit 100 would have to wait for five clock cycles of the independent clock in the DONE state in order to sync with the 10 MHz system clock.

A specific example of the principles of the invention will now be described with reference to FIGS. 1, 2 and 3. An instruction is written to instruction register 101 indicating that a multiplication of an unsigned multiplicand and an unsigned multiplier is desired. Instruction register 101 may send the instruction to decoder 102. As mentioned previously, the multiplexers 111, 112, 113, 116, and 117 all provide zeros to the ALU 115 during the INIT state.

Decoder 102 may be any decoder known to one skilled in the art. Decoder 102 may decode the received instruction. Decoder 102 may also receive an input from multiply and divide state machine 137 when an operation is complete. Decoder 102 may then send the decoded instruction to input register 103 indicating that a multiply of an unsigned multiplicand and an unsigned multiplier is desired. Since the instruction is for an unsigned multiplier and multiplicand, decoder 102 would send a binary 0 to one input of AND gate 104 and a binary 0 to one input of AND gate 105.

Input register 103 receives the decoded instruction at the CTL input. The decoded instruction directs input register 103 to select an unsigned multiplicand and an unsigned multiplier. For example, the unsigned multiplicand may be the four bit binary number {0111} and the unsigned multiplier may be the four bit binary number {0101}. These values will then be sent out of the rdA and rdB outputs respectively.

The most significant bit of the multiplicand, in this case a binary 0, is sent to an input terminal of AND gate 105. As mentioned previously, AND gate 105 also received a binary 0 from the decoder 102 because the multiplicand was unsigned. As both inputs are binary 0s, AND gate 105 sends a binary 0 to multiplexer 108. The AND gate 105 also sends a binary 0 to an input terminal of XOR gate 129 and to an input terminal of multiply and divide state machine 137.

In like manner, the most significant bit of the multiplier, in this case also a binary 0, is sent to an input terminal of AND gate 104. As mentioned previously, AND gate 104 also received a binary 0 from the decoder 102 because the multiplier was unsigned. As both inputs are binary 0s, AND gate 104 sends a binary 0 to an input terminal of XOR gate 129. The output of XOR gate 129 is then sent to an input terminal of multiply and divide state machine 137.

The unsigned multiplicand {0111} is received by extenders 106 and 107. Extender 106 performs normal extensions while extender 107 performs signed extensions. In this case, the multiplicand is extended by extender 106 to {00000111}. The multiplicand is extended by extender 107 to {00000111} as it is a positive number.

As mentioned, AND gate 105 provides a binary 0 to multiplexer 108. Multiplexer 108 may be triggered by a binary 1 or binary 0. When multiplexer 108 receives a binary 0, it allows the normal extended value to pass. Conversely, if multiplexer 108 receives a binary 1, it allows the sign extended value to pass. In this case, the normal extended value of {00000111} passes to multiplexer 109.

Multiplexer 109 may also be triggered by either a binary 1 or binary 0. To the left of multiplexer 109 is an AND gate 125. In the MUL_PRDSHL state, AND gate 125 may provide a binary 1 to trigger the multiplexer. In the MUL_ITERATE state, however, a binary 0 is provided to multiplexer 109 and the normal extended value of {00000111} is passed onto shifter 110.

Referring again to FIG. 1, multiplexers 131 and 132 are shown coupled to the multiply and divide state machine 137. In addition, a bit select register 126 is also shown. Bit select register 126 has data written to it that determines the selection of the number of bits that will be shifted by shifter 110. In the MUL_ITERATE state, bit select register 126 is set to 1. In this same state, multiplexer 132 is set to a binary 0.

Multiplexer 131 receives two inputs from the multiply and divide state machine 137 that identify the current state of the operation and direct which bit the multiplexer will provide. If the operation is a multiplication, the multiplexer 131 will provide a +1 bit. Conversely, in a divide, a −1 bit is provided by the multiplexer. The bit provided by multiplexer 131 and the value written in bit select register 126 are then provided to iterator 120.

Iterator 120 receives the signal from multiplexer 131 and the bit select register 126. Iterator 120 also receives an input from input register 103. Iterator 120 acts as a counter that sends one bit select signal to shifter 110 every cycle. For example, in the MUL_ITERATE state the bit select begins at 1 and increases by +1. If the operand is eight bits long, then iterator 120 would send the first bit select signal during the first clock cycle, the second bit select signal during the second clock cycle, and so on until eight bit select signals had been sent.

The OR gate 133, the AND gate 134, the register 135, and the XOR gate 136 are configured to implement a twos compliment function on the current bit being selected by integrator 120 and bit select register 126. This logic also has an effect on multiplexers 116 and 117 as the two compliment function is associated with the "bit=0" and "bit=1" shown in FIG. 3 for these multiplexers. Note that register 135 is set following the first 1 bit found and that factors into inverting the subsequent bits as is done in a twos compliment operation.

In the present example, shifter 110 receives the normal extended value of {00000111} from multiplexer 109 as discussed previously. Shifter 110 may be any shifter logic known to one skilled in the art. Shifter 110 shifts the received value a number of bits on receiving the signal from iterator 120. For example, in the first clock cycle, shifter 110 shifts the received normal extended value zero bits and provides the result to multiplexer 112. In the second clock cycle, shifter 110 shifts the received normal extended value by one bit and also provides the result to multiplexer 112. This process (i.e., shifting by an additional bit every clock cycle) is repeated by shifter 110 for the length of the MUL_ITERATE state. In this way, the different values may be interactively provided to the ALU 115 for processing.

In the present example, the value of {00000111} is provided to multiplexer 112 during the first clock cycle. Referring to FIG. 3, it is shown that during the MUL_ITERATE state, the 001 input is always selected. This means that the shifted values provided by shifter 110 are passed through to multiplexer 114.

Multiplexer 114 has two inputs, one of which is coupled to inverter 114A. Referring to FIG. 3, it is shown that if the shifted value is a positive, then the value passes unchanged through multiplexer 114. Conversely, if the shifted value is negative, then the shifted value would pass through inverter 114A and all the bits of the shifted value would be changed. In the present example, {00000111} is positive and so passes through multiplexer 114 unchanged to ALU 115.

ALU 115, as mentioned previously, may receive three inputs, one each from multiplexers 112 and 113 and a carry-over input from multiplexer 111. Since it was zero during the INIT stage, there would still be a zero for the input from multiplexer 113. Referring to FIG. 3, it is shown that carry-over multiplexer 111 provides a zero when the input from multiplexer 112 is positive as is the case in the present example. ALU 115 adds the values of the three inputs and a sum of {00000111} is produced.

The summed value of {00000111} is split and provided to multiplexers 116 and 117. The four bits on the left, {0000}, are provided to multiplexer 116 while the left four bits on the right, {0111} are provided to multiplexer 117. Referring to FIG. 3, it is shown that multiplexer 116 passes the {0000} value to output register 118. Output register 118 is configured to store high product values. Again referring to FIG. 3, it is shown that multiplexer 117 passes the {0111} value to output register 119. Output register 119 is configured to store the low product values.

The {0000} value in output register 118 and the {0111} value in output register 119 are combined again to form a value of {00000111}. This value is sent to the WdD and WdDX inputs of input register 103 where it is written for later use. The value is also sent to the input of multiplexers 112 and 113 where the value may be used in later calculations by circuit 100.

Returning again to shifter 110, during the second clock cycle of the MUL_ITERATE state, the shifted value becomes {00001110}. As mentioned, this value is passed through both multiplexers 112 and 114 to ALU 115. However, this time there is a value for the input from multiplexer 113. According to FIG. 3, multiplexer 113 provides the result of the first cycle, {00000111}, to ALU 115. ALU 115 adds the two values and a sum of {00010101} is produced.

The summed value is split and {0001} is provided to multiplexer 116 while {0101} is provided to multiplexer 117. These values are passed by the multiplexers and combined to form {00100101}. This value is also provided to input register 103 and multiplexer 113. The process described for the first two clock cycles will be repeated for the remainder the MUL_ITIERATE state (i.e. the multiplicand will be shifted by a number of bits and the value will be added to other values by the ALU 115).

The multiply and divide circuit 100 will then switch to the MUL_PRD2COMP state. In this state, the result of the last iteration of the previous state is passed through multiplexer 112 to ALU 115. In the present example, this will be {01101001}. In this state, multiplexer 111 provides a one and multiplexer 113 provides a zero. The ALU 115 adds the three values and a sum of {01101010} is produced.

The sum is split with {0110} provided to multiplexer 116 while {1010} is provided to multiplexer 117. Referring to FIG. 3, it is shown that because the value provided to multiplexer 116 is positive, the high product stored in output register 118 from the last iteration of the previous state is fed back into the multiplexer and passed to output register 118. The {1010} value, however, is passed through multiplexer 117 to output register 119. The values in the output registers are combined to form {01101010} and this value is provided to multiplexer 113 and input register 103 for later use.

The multiply and divide circuit 100 will then switch to the MUL_PRDSHL state. During the MUL_ITERATE state, the multiplier {0101} was provided to extender 121 and sign extender 122, and was extended accordingly. Both of the extended values were provided to multiplexer 112. Referring to FIG. 3, during the MUL_PRDSHL state, the normal extended value of {00000101} is passed through multiplexer 112 and the positive input of multiplexer 114 to ALU 115. In addition, multiplexers 111 and 113 provide zeros to ALU 115. The ALU 115 adds the three input values and a sum of {00000101} is produced.

The sum is divided and {0000} is provided to multiplexer 116 while {0101} is provided to multiplexer 117. However, in this state multiplexers 116 and 117 pass the result of the previous state stored in output registers 118 and 119 respectively. In this case, a {0110} is passed by multiplexer 116 to output register 118 and a {0101} is passed by multiplexer 117 to output register 119. The values in the registers are combined to {01100101} and this value is provided to multiplexer 113 and input register 103 for later use. The multiply and divide circuit 100 may then enter the DONE state where multiplexers 111, 112, 113, 116 and 117 all provide zeros and the process may begin again.

In some embodiments, multiply and divide circuit 100 is configured to shift the product a chosen number of bits. In this embodiment, instruction register 101 receives an instruction for a multiply as previously described. During the MUL_ITERATE and MUL_PRD2COMP states, multiply and divide circuit 100 operates as described in the previous example (i.e. By iteratively shifting and providing values to the ALU 115 for addition). In addition, during the MUL_PRD2COMP state, a desired bit select shift value is written to bit select register 126. For example, if it was desirable for shifter 110 to shift a value by three bits, then a bit select value for this would be written to register 126. A one bit is also provided from the rS output of input register 103 to multiplexer 132, which triggers the bit select register 126. Also, during the MUL_PRD2COMP state, output registers 118 and 119 provide the product to multiplexer 109.

During the MUL_PRDSHL state, an instruction for a shift is written to AND gate 125. This instruction and the MUL_PRDSHL state cause AND gate 125 to assert a 1 on multiplexer 109. On receiving a 1, multiplexer 109 passes the product from the previous state instead of the value from extenders 106 or 107. From the example above, the passed product value is {01101010} which is passed to shifter 110.

Shifter 110 receives the desired bit select signal discussed previously. For example, if a desired shift select value of one were written to bit select register 126, then shifter 110 would shift the passed product value to the left by one bit. This would produce a value of {11010100}, which is provided to multiplexer 112.

In this special bit select mode, multiplexers 112 and 114 pass the shifted value to ALU 115. In this state, multiplexers 111 and 113 provide zeros. The summed value therefore is {11010100}.

The summed value is divided with {1101} being provided to multiplexer 116 and {0100} being provided to multiplexer 117. Referring to FIG. 3, it is shown that in the bit select mode, multiplexer 116 passes the {1101} value to output register 118 and multiplexer 117 passes the {0100} value to output register 119. These values are combined and provided to input register 103 and multiplexer 113 for further use.

As mentioned previously, multiplier and divide circuit 100 may also perform multiplication on signed multiplicands and signed multipliers or a combination of signed and unsigned multiplicands and signed and, unsigned multipliers. For example, suppose that the multiply and divide circuit 100 was in the MUL_ITERATE state. An instruction may be written to instruction register 101 indicating that a multiplication of a signed multiplicand and an unsigned multiplier is desired. Instruction register 101 may send the instruction to decoder 102.

Decoder 102 may decode the received instruction. Decoder 102 may then send the decoded instruction to input register 103 indicating that a multiply of a signed multiplicand and an unsigned multiplier is desired. Since the instruction is for a signed multiplicand and unsigned multiplier, decoder 102 would send a binary 0 to one input of AND gate 104 and a binary 1 to one input of AND gate 105.

Input register 103 may receive the decoded instruction at the CTL input. The decoded instruction will direct input register 103 to select a signed multiplicand and an unsigned multiplier. For example, the signed multiplicand may be the four bit binary number {1010} and the unsigned multiplicand may be the four bit binary number {0101}. These values will then be sent out of the rdA and rdB outputs respectively.

The most significant bit of the multiplicand, in this case a 1, is sent to an input terminal of operand AND gate 105. As mentioned previously, AND gate 105 also received a 1 from the decoder 102 because the multiplicand was signed. As both inputs are 1, AND gate 105 sends a 1 to multiplexer 108. The AND gate 105 also sends a binary 1 to an input terminal of XOR gate 129.

The signed multiplicand {1010} is received by extenders 106 and 107. Extender 106 performs normal extensions while extender 107 performs signed extensions. In this case, the multiplicand is extended by extender 106 to {00001010}. The multiplicand is extended by sign extender 107 to {11111010}.

As mentioned, AND gate 105 provides a binary 1 to multiplexer 108. This causes the signed extended value to be sent to multiplexer 109. The signed extended value will then be sent to shifter 110. The iterative shifting controlled by the signals from bit select register 126, multiplexer 131, and iterator 120 function in the same manner as previously described. In addition, multiplexers 111, 112, 113, 114, 116, and 117, ALU 115, and output registers 118 and 119 all pass and manipulate the signed extended value in the same manner as they passed and manipulated the normal extended value already described.

Multiply and divide circuit 100 also performs division operations on signed and unsigned dividends and divisors or any combination of signed and unsigned dividends and divisors. A specific example of a division operation will now be described with reference to FIGS. 1, 2 and 3. An instruction is written to instruction register 101 indicating that a division of an unsigned dividend and an unsigned divisor is desired. Instruction register 101 may send the instruction to decoder 102. As mentioned above, the multiplexers 111, 112, 113, 116, and 117 are all set to zero during the INIT state.

Decoder 102 decodes the instruction and sends the decoded instruction to input register 103 indicating that an unsigned dividend and an unsigned divider are desired. Since the instruction is for an unsigned dividend and divisor, decoder 102 would send a binary 0 to one input of AND gate 104 and a binary 0 to one input of AND gate 105.

Input register 103 may receive the decoded instruction at the CTL input. The decoded instruction will direct input register 103 to select an unsigned dividend and an unsigned divisor. For example, the unsigned dividend may be the four bit binary number {0111} and the unsigned divisor may be the four bit binary number {0101}. These values will then be sent out of the rdA and rdB outputs respectively.

During the DIV_DND2COMP state, the most significant bit of the dividend, in this case a binary 0, is sent to an input terminal of AND gate 104. As mentioned previously, AND gate 105 also received a binary 0 from the decoder 102 because the dividend was unsigned. The AND gate 104 also sends a binary 0 to an input terminal of XOR gate 129.

In like manner, the most significant bit of the divisor, in this case also a binary 0, is sent to an input terminal of AND gate 105. As mentioned previously, AND gate 105 also received a 0 from the decoder 102 because the divisor was unsigned. As both inputs are binary 0s, AND gate 105 sends a binary 0 to an input terminal of XOR gate 129 and an input terminal of multiply and divide state machine 137. The output of XOR gate 129 is also sent to an input terminal of multiply and divide state machine 137.

The unsigned divisor {0101} is received by extenders 121 and 122. Extender 121 performs normal extensions while extender 122 performs signed extensions. In this case, the divisor is extended by extender 121 to {00000101}. Additionally, the divisor is extended by signed extender 122 to {00000101} as it is a positive number.

Referring to FIG. 3, it is shown that multiplexer 112 pass the normal extended value of {00000101} from extender 121 as the value is positive. However, if the extended value was signed and negative, then the value from signed extender 122 would have been passed by multiplexer 112. The normal extended value is then passed through multiplexer 114 without being inverted as it is a positive value and is provided to ALU 115.

In the DIV_DND2COMP state, multiplexers 111 and 113 both provide zeros to ALU 115. When the values are summed together, a sum of {00000101} is produced. This value is split with {0000} being provided to multiplexer 116 and {0101} being provided to multiplexer 117.

Referring again to FIG. 3, it is shown that multiplexer 116 provides {0000} to output register 118. Additionally, multiplexer 117 provides {0101} to output register 119. These values are combined to form {00000101} and are provided to input register 103 and multiplexer 113 for further use.

During the DIV_ITERATE state, the dividend {0111} is sent to extenders 106 and 107. Extender 106, a normal extender, produces a value of {00000111}. The sign extender 107 also produces a value of {00000111} as the value is positive.

AND gate 105 provides a binary 0 to multiplexer 108. As mentioned previously, multiplexer 108 may be triggered by a binary 1 or binary 0. When multiplexer 108 receives a binary 0, it allows the normal extended value to pass. Conversely, if multiplexer 108 receives a binary 1, it allows the sign extended value to pass. In this case, the normal extended value of {00000111} passes to multiplexer 109. During a division operation, multiplexer 109 always passes the value received from multiplexer 108 to shifter 110.

Referring again to FIG. 1, multiplexers 131 and 132 are shown coupled to the multiply and divide state machine 137. In addition, a bit select register 126 is also shown. As mentioned, bit select register 126 has data written to it that determines the selection of the number of bits that will be shifted by shifter 110. In the present example, during the DIV_ITERATE state the bit select register 126 is set to 4. In this same state, multiplexer 132 is set to a binary 0.

Multiplexer 131 receives two inputs from the multiply and divide state machine 137 that identify the current state of the operation and direct which bit the multiplexer will provide. In a divide, a −1 bit is provided by the multiplexer. The bit provided by multiplexer 131 and the value written in bit select register 126 are then provided to iterator 120.

Iterator 120 receives the signal from multiplexer 131 and the bit select register 126. Iterator 120 also receives an input from input register 103. During a divide, the iterator 120 decreases by −1 bits from four to zero.

In the present example, shifter 110 receives the normal extended value of {00000111} from multiplexer 109 as discussed previously. Shifter 110 shifts the received value a number of bits on receiving the input from iterator 120. For example, in the first clock cycle, shifter 110 shifts the received normal extended value four bits and provides the result to multiplexer 112. In the second clock cycle, shifter 110 shifts the received normal extended value by three bits and also provides the result to multiplexer 112. This process (i.e., shifting by an additional −1 bit every clock cycle) is repeated by shifter 110 for the length of the DIV_ITERATE state. In this way, the different values may be interactively provided to the ALU 115 for processing.

In the present example, the value of {00000111} is shifted by four bits and becomes {01110000, which is provided to multiplexer 112 during the first clock cycle. Referring to FIG. 3, it is shown that during the DIV_ITERATE state, the 001 input is always selected. This means that the shifted values provided by shifter 110 are passed through to multiplexer 114. In the present example, {01110000} is positive and so passes through multiplexer 114 unchanged to ALU 115.

The four right most bits of the output from the prior state are provided to extender 124. In this case, the four right most bits are {0101}, which when extended by extender 124 become {00000101}. This value is provided to multiplexer 113.

ALU 115, as mentioned previously, may receive three inputs, one each from multiplexers 111, 112, and 113. Referring to FIG. 3, it is seen that multiplexer 111 provides a one to ALU 115 when the value from multiplexer 114 is positive. In addition, multiplexer 113 provides the extended value from extender 124. ALU 115 adds all three inputs and produces a value of {01111011}.

The summed value of {01111011} is split and provided to multiplexers 116 and 117. The four bits on the left, {0111}, are provided to multiplexer 116, while the four bits on the right, {1011} are provided to multiplexer 117. Referring to FIG. 3, it is shown that multiplexer 116 passes the {0111} value to output register 118. In some iterations, however, this value may be shifted by shifter 138 and provided to multiplexer 116. Again referring to FIG. 3, it is shown that multiplexer 117 passes the {1011} value to output register 119.

The {0111} value in output register 118 and the {1011} value in output register 119 are combined again to form a value of {01111011}. This value is sent to input register 103 where is may be written for later use. The value is also sent to an input of multiplexer 113 where the value may be used in later calculations by circuit 100.

Returning again to shifter 110, during the second clock cycle of the DIV_ITERATE state, the value is shifted by three bits and becomes {00111000}. As mentioned, this value is passed through both multiplexers 112 and 114 to ALU 115.

The four right most bits of the output from the prior iteration are provided to extender 124. In this case, the four right most bits are {1011}, which when extended by extender 124 become {00001011}. This value is provided by multiplexer 113 to ALU 115. In addition, a one bit is provided to ALU 115 by multiplexer 111. ALU 115 adds all three inputs and produces a value of {01000100}.

The summed value of {01000100} is split and provided to multiplexers 116 and 117. The four bits on the left, {0100}, are provided to multiplexer 116 while the left four bits on the right, {0100} are provided to multiplexer 117. Referring to FIG. 3, it is shown that multiplexer 116 passes the {0100} value to output register 118. Again referring to FIG. 3, it is shown that multiplexer 117 passes the {0100} value to output register 119.

The {0100} value in output register 118 and the {0100} value in output register 119 are combined again to form a value of {01000100}. This value is sent to input register 103 where is may be written for later use. The value is also sent to an input of multiplexer 113 where the value may be used in later calculations by circuit 100. The process described for the first two clock cycles will be repeated for the remainder of the DIV_ITIERATE state.

The multiply and divide circuit 100 will then switch to the DIV_QUO2COMP state. In this state, the four left most bits of the result of the last iteration of the previous state are provided to extender 123, normal extended, and provided to multiplexer 112. In the present example, this will be {0001}, which will be extended to {00000001}. Referring to FIG. 3, this value is inverted by multiplexer 114 and then provided to ALU 115. In the present example, the {00000001} value becomes {11111110}. In addition, in this state multiplexer 111 provide a one and multiplexer 113 provides a zero. The ALU 115 adds the three values and a sum of {11111111} is produced.

The sum is divided and {1111} is provided to multiplexer 116 while {1111} is provided to multiplexer 117. In this case, the {1111} is passed by multiplexer 116 to output register 118. However, multiplexer 117 passes the output of the last state stored in output register 119, a {0000}, to output register 119. The values in the registers are combined to {11110000} and this value is provided to multiplexer 113 and input register 103 for later use. The multiply and divide circuit 100 may then enter the DONE state where multiplexers 111, 112, 113, 116 and 117 are all provided with zeros and the process may begin again.

Accordingly, the principles of the present invention relate to a multiply and divide circuit. The multiply and divide circuit includes an input register, an instruction register, an ALU, and configuration circuitry. The configuration circuitry is configured to respond to an instruction to perform both multiplication and division by iteratively providing values to the ALU. In addition, the configuration circuitry is designed to perform multiplication and/or division on any combination of signed and unsigned values. Accordingly, the principles of the present invention are a significant advancement in the art of multiply and divide circuits.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A circuit capable of multiplication and division, the circuit comprising:
   an instruction register configured to store an instruction to perform an operation, the circuit being configured to support instructions for operations that include at least a multiply operation, a divide operation, and a combined multiply and divide operation;
   an input register configured to store first and second operands of the operation;
   an adding unit including one or more adders, the adding unit configured to add two non-constant input values and a carry-over bit, wherein at least one of the non-constant input values is at least a portion of one of the first and second operands of the operation; and
   configuration circuitry configured to iteratively provide the two non-constant input values to the adding unit in response to the instruction, the configuration circuitry including:
      a first multiplexer for selecting a c-value to provide to the adding unit as the carry-over bit based on whether the first operand is signed or unsigned and the operation being performed;
      a second multiplexer configured to provide an a-value, the second multiplexer being configured to select the a-value to provide from a plurality of potential a-values, the a-value being selected based on the operation being performed and the plurality of potential a-values that include a shifted and extended first operand, an extended second operand, a signed extended second operand, and previous outputs of the adding unit;
      a third multiplexer configured to select the a-value or an inverse of the a-value to provide to the adding unit as one of the two non-constant input values based on whether the first operand is signed or unsigned and the operation being performed;
      a fourth multiplexer configured to select a b-value to provide to the adding unit as another of the two non-constant input values based on the operation being performed, the b-value being selected from a plurality of potential b-values based on the previous outputs of the adding unit;
      a fifth multiplexer that receives a first portion of the output of the adding unit at a first fifth multiplexer input port and a second portion of the output of the adding unit at a second fifth multiplexer input port; and
      a sixth multiplexer that receives the first portion of the output of the adding unit at a first sixth multiplexer input port.

2. The circuit of claim 1, wherein the configuration circuitry includes one or more extenders that are configured to perform signed or unsigned extensions on the first and second operands.

3. The circuit of claim 1, wherein the configuration circuitry includes one or more shifters that are configured to shift one of the first and second operands a number of bits determined by other components of the configuration circuitry.

4. The circuit of claim 1, wherein the configuration circuitry includes one or more registers for storing different values that are used by other components of the configuration circuitry to perform the operation.

5. The circuit of claim 1, wherein the configuration circuitry includes one or more decoders configured to decode the instruction to perform the operation.

6. The circuit of claim 1, wherein the first operand is a signed value and the second operand is one of a signed value or an unsigned value when the operation is the multiple operation.

7. The circuit of claim 1, wherein the first operand is a signed value and the second operand is one of a signed value or an unsigned value when the operation is the divide operation.

8. The circuit of claim 1, wherein the circuit is part of an optical transceiver which includes a system clock.

9. The circuit of claim 1, wherein the sixth multiplexer further receives a previous output of the sixth multiplexer at a second sixth multiplexer input port, wherein for a selected operation an output of the sixth multiplexer is selected based on the operation being performed and a sum of the bits of the second portion of the output of the adding unit.

10. An optical transceiver including a circuit, the circuit comprising:
   an instruction register configured to store an instruction to perform an operation, the circuit being configured to support instructions for operations that include at least a multiply operation, a divide operation, and a combined multiply and divide operation;
   an input register configured to store first and second operands of the operation;
   an adding unit including one or more adders, the adding unit configured to add two non-constant input values and a carry-over bit, wherein at least one of the non-constant input values is at least a portion of one of the first and second operands of the operation;

configuration circuitry configured to iteratively provide the two non-constant input values to the adding unit in response to the instruction, the configuration circuitry including:

a first multiplexer for selecting a c-value to provide to the adding unit as the carry-over bit based on whether the first operand is signed or unsigned and the operation being performed;

a second multiplexer configured to provide an a-value, the second multiplexer being configured to select the a-value to provide from a plurality of potential a-values, the a-value being selected based on the operation being performed and the plurality of potential a-values that include a shifted and extended first operand, an extended second operand, a signed extended second operand, and previous outputs of the adding unit;

a third multiplexer configured to select the a-value or an inverse of the a-value to provide to the adding unit as one of the two non-constant input values based on whether the first operand is signed or unsigned and the operation being performed;

a fourth multiplexer configured to select a b-value to provide to the adding unit as another of the two non-constant input values based on the operation being performed, the b-value being selected from a plurality of potential b-values based on the previous outputs of the adding unit;

a fifth multiplexer that receives a first portion of the output of the adding unit at a first fifth multiplexer input port and a second portion of the output of the adding unit at a second fifth multiplexer input port; and a sixth multiplexer that receives the first portion of the output of the adding unit at a first sixth multiplexer input port; and a state machine configured to control states of the configuration circuitry and to direct the selection of the c-value by the first multiplexer, the states including a DONE state in which the circuit resets and waits for one or more cycles of a synchronous clock to synchronize the circuit with a system clock of the optical transceiver.

* * * * *

UNITED STATES PATENT AND TRADEMARK OFFICE
CERTIFICATE OF CORRECTION

Page 1 of 1

PATENT NO.       : 8,930,434 B2
APPLICATION NO.  : 11/531074
DATED            : January 6, 2015
INVENTOR(S)      : Dybsetter It is certified that error appears in the above-identified patent and that said Letters Patent is hereby corrected as shown below:

In the specification

In Column 2, Line 21, delete "would" and insert -- bit would --, therefor.

In Column 3, Line 42, delete "illustrates" and insert -- illustrates a --, therefor.

In Column 4, Line 12, delete "register 102" and insert -- register 103 --, therefor.

In Column 5, Line 15, delete "done" and insert -- DONE --, therefor.

In Column 5, Line 22, delete "hit" and insert -- bit --, therefor.

In Column 5, Line 36, delete "110 are used as accumulatin" and insert -- 119 are used as accumulation --, therefor.

In Column 6, Line 61, delete "onto" and insert -- on to --, therefor.

In Column 9, Line 14, delete "By" and insert -- by --, therefor.

In Column 9, Line 51, delete "and," and insert -- and --, therefor.

In Column 12, Line 5, delete "{01110000," and insert -- {01110000}, --, therefor.

Signed and Sealed this
Twenty-seventh Day of October, 2015

Michelle K. Lee
*Director of the United States Patent and Trademark Office*